(12) United States Patent
Tan et al.

(10) Patent No.: US 7,138,436 B2
(45) Date of Patent: Nov. 21, 2006

(54) UNCROSSLINKED FOAMS MADE FROM EMULSIONS

(75) Inventors: Lian Soon Tan, Woodbury, MN (US); Kristin LaVelle Thunhorst, Stillwater, MN (US)

(73) Assignee: 3M Innovative Properties Company, St. Paul, MN (US)

(*) Notice: Subject to any disclaimer, the term of this patent is extended or adjusted under 35 U.S.C. 154(b) by 555 days.

(21) Appl. No.: 09/880,269

(22) Filed: Jun. 13, 2001

(65) Prior Publication Data

US 2003/0011092 A1 Jan. 16, 2003

(51) Int. Cl.
*C08J 9/00* (2006.01)
*C08J 9/28* (2006.01)

(52) U.S. Cl. .................. 521/64; 521/142; 521/50.5

(58) Field of Classification Search .................. 521/64, 521/50.5, 142
See application file for complete search history.

(56) References Cited

U.S. PATENT DOCUMENTS

| | | | |
|---|---|---|---|
| 3,255,127 A | 6/1966 | Wulf von Bosin | 260/2.5 |
| 3,256,219 A | 6/1966 | Will | 260/2.5 |
| RE27,444 E | 7/1972 | Will | 260/2.5 |
| 3,734,867 A | 5/1973 | Will | 260/2.5 |
| 3,988,508 A | 10/1976 | Liasant | 526/344 |
| 4,038,350 A | 7/1977 | Jaques | 264/22 |
| 4,039,439 A | 8/1977 | Clark | 210/14 |
| 4,142,956 A | 3/1979 | Shikinami et al. | 204/159.14 |
| 4,522,953 A | 6/1985 | Barby et al. | 521/64 |
| 4,644,013 A | 2/1987 | Fujie et al. | |
| 4,767,793 A | 8/1988 | Schisler et al. | 521/50.5 |
| 4,771,078 A | 9/1988 | Schisler et al. | 521/50.5 |
| 4,912,169 A | 3/1990 | Whitmire et al. | |
| 5,006,187 A | 4/1991 | Cook et al. | 156/244.11 |
| 5,037,859 A | 8/1991 | Williams, Jr. et al. | 521/55 |
| 5,149,720 A | 9/1992 | DesMarais et al. | 521/63 |
| 5,198,472 A | 3/1993 | DesMarais et al. | 521/63 |
| 5,260,345 A | 11/1993 | DesMarais et al. | 521/148 |
| 5,262,444 A | 11/1993 | Rusincovitch et al. | 521/50.5 |
| 5,290,820 A | 3/1994 | Brownscombe et al. | 521/64 |
| 5,352,711 A | 10/1994 | DesMarais | 521/149 |
| 5,387,207 A | 2/1995 | Dyer et al. | 604/369 |
| 5,545,676 A | 8/1996 | Palazzotto et al. | 522/15 |
| 5,563,179 A | 10/1996 | Stone et al. | 521/64 |
| 5,646,193 A | 7/1997 | Brownscombe et al. | 521/63 |
| 5,691,846 A | 11/1997 | Benson, Jr. et al. | 359/530 |
| 5,856,366 A | 1/1999 | Shiveley et al. | 521/63 |
| 5,922,780 A * | 7/1999 | Dyer et al. | 521/150 |
| 6,015,609 A | 1/2000 | Chaouk et al. | 428/308.4 |
| 6,136,874 A | 10/2000 | Dyer et al. | |

FOREIGN PATENT DOCUMENTS

| | | |
|---|---|---|
| CA | 1 195 791 A1 | 10/1985 |
| DE | 1 544 690 | 12/1964 |
| EP | 0 000 933 B1 | 8/1978 |
| EP | 0 068 830 A1 | 1/1983 |
| EP | 0 216 622 A | 4/1987 |
| EP | 0 430 517 A | 6/1991 |
| EP | 0 864 685 A2 | 9/1998 |
| GB | 1 428 125 | 3/1976 |
| GB | 1 458 203 | 12/1976 |
| GB | 1 493 356 | 11/1977 |
| JP | 51-111279 | 10/1976 |
| JP | 51-111280 | 10/1976 |
| JP | 57-063334 A2 | 4/1982 |
| JP | 58-038786 A1 | 3/1983 |
| JP | 58-087134 A2 | 5/1983 |
| JP | 03-267172 | 11/1991 |
| JP | 03-275177 | 12/1991 |
| JP | 04148978 | 5/1992 |
| JP | 07 335053 | 12/1995 |
| JP | 10-139945 | 11/1996 |
| WO | WO 96/21680 | 7/1996 |
| WO | WO 96/21682 | 7/1996 |
| WO | WO 96/40528 | 12/1996 |
| WO | WO 97/31600 | 9/1997 |
| WO | WO 97/32612 | 9/1997 |

OTHER PUBLICATIONS

G.Odian, "Principles of Polymerization". John Wiley & Sons, New York, 1981, pp. 205-209.*
J. M. Williams, and D. A. Wrobleski, *Spatial Distribution of the Phases in Water-in-Oil Emulsions. Open and Closed Microcellular Foams from Cross-Linked Polystyrene*, Langmuir, vol. 4, No. 3, 1988, pp. 656-662.
J. M. Williams, *High Internal Phase Water-in-Oil Emulsions: Influence of Surfactants and Cosurfactants on Emulsion Stability and Foam Quality*, Langmuir, vol. 7, No. 7, 1991, pp. 1370-1377.
M. A. Hoisington, J. R. Duke, and P. G. Apen, *High Temperature, Polymeric, Structural Foams from High Internal Phase Emulsion Polymerizations*, Polymer, vol. 38, No. 13, 1997, pp. 3347-3357.
P. G. Apen, J. M. Williams, *Bromine—Containing Polymeric Foams*, J. Cell. Plast. (Nov. 1992), 28 (6), 557-70.

* cited by examiner

Primary Examiner—Irina S. Zemel
(74) Attorney, Agent, or Firm—Sean J. Edman

(57) ABSTRACT

The invention discloses methods for making uncrosslinked foams by polymerizing emulsions comprising a reactive phase and a phase immiscible with the reactive phase components. Foams made from water-in-oil emulsions, including high internal phase emulsion are disclosed. The foams may be polymized with photoinitiators, thermal initiators, or redox initiators. Articles and uses for the foams are also described.

13 Claims, 4 Drawing Sheets

UNCROSSLINKED FOAMS MADE FROM EMULSIONS

TECHNICAL FIELD

This invention relates to foams made by polymerizing emulsions without a crosslinker. The emulsions comprise a reactive phase and an immiscible phase wherein the reactive phase or both phases are continuous. The emulsions contain no effective crosslinker. The resulting foams may be closed or open cell, depending on the initial emulsion microstructure.

SUMMARY OF INVENTION

The present invention features a novel method for creating uncrosslinked foams, including open cell foams, from water-in-oil type emulsions. The applicants found, surprisingly, that they could make foams from high internal phase emulsions (HIPEs) and other water-in-oil emulsions without the presence of crosslinking agents. This is unexpected because foams made by polymerizing emulsions normally require crosslinking agents to permit formation of a stable foam structure that does not collapse under the heat of polymerization or upon the subsequent removal of the immiscible phase. Applicants found that they could cure an emulsion to form a stable foam if they used polymerizable materials that formed a polymer having a glass transition temperature high enough to avoid collapse or loss of porosity upon polymerizing or drying. Because the foams are uncrosslinked, they can later be collapsed by heating to a temperature above the foam's glass transition temperature. Uncrosslinked foams are also sensitive to, and can potentially be dissolved by, solvents.

The foams may be made by a batch process, or a continuous process in which the emulsion may be coated on a moving support. In either case, the foam is polymerized by exposure to actinic radiation or heat or via redox polymerization. Some embodiments of the foams may be polymerized within one second or less of radiation illumination time. This fast polymerization process allows a broad range of materials to be used because the emulsion needs to be stable for only a short time (seconds to minutes).

One aspect of the present invention provides a process for making a polymeric foam comprising: a) mixing a reactive phase comprising at least one polymerizable material having an effective glass transition temperature sufficient to permit the formation of a stable foam upon polymerization of the material and subsequent removal of an immiscible phase with no effective amount of crosslinking agent, at least one emulsifier, at least one initiator system, and a liquid immiscible with the reactive phase to form an emulsion wherein the immiscible liquid forms a discontinuous or co-continuous phase with the continuous reactive phase; b) shaping the emulsion; and c) causing the emulsion to polymerize such that it forms a stable uncrosslinked foam.

The process may comprise further steps of exposing the emulsion to heat and/or removing residual immiscible fluid from the foam.

The polymerizable material may be ethylenically-unsaturated, such as acrylates, methacrylates, vinyls, and may be either free-radically curable or cationically-curable. The polymerizable material may be the same material as the emulsifier.

The immiscible phase is typically water, but may comprise other liquids such as fluorocarbons or organic liquids. For the HIPE foams, the immiscible fluid comprises 74 volume percent, or more, of the emulsion. Non-HIPE foams containing less than 74 volume percent of an immiscible phase are also covered by the present invention.

The reactive phase may include, e.g., non-polymerizable materials and materials that can incorporate functional groups into the foam.

The structure of the foam of the present invention may be controlled by aging the emulsion prior to polymerization or by using a particular agitation method for making the emulsion.

The emulsion may include photoinitiators in one or both of the reactive and immiscible phase. Preferably, the photoinitiators are activated by ultraviolet or visible radiation of 300 to 800 nanometers. The emulsion may include thermal initiators in one or both of the reactive or immiscible phase. If a redox initiating system is used, the oxidizing agent is typically in the reactive phase while the reducing agent is in the immiscible phase. Alternatively, the reducing agent may be in the reactive phase while the initiator is in the immiscible phase. It may also be possible to have the oxidizing agent and reducing agent in the same phase. However, if this is done, it is desirable that the emulsion formation and shaping of the emulsion be done quickly, because the redox reaction will proceed rapidly.

Polymerization and crosslinking of the emulsion may occur in as little as 10 minutes or even 10 seconds.

A further aspect of the invention is an emulsion having a continuous reactive phase comprising at least one polymerizable material, at least one photoinitiator, thermal initiator, or redox initiating system, no effective amount of crosslinking agent, and a discontinuous or co-continuous phase comprising a liquid fluid immiscible with the reactive phase.

The foams may be polymerized within the voids of a material selected from the group consisting of polymeric, woven, nonwoven, and metals. Alternatively, the foam may contain non-polymerizable materials selected from the group consisting of polymers, metals, particles, and fibers.

Another aspect of the present invention is articles made using the foams of the present invention.

Foams of the present invention made from HIPEs have relatively homogeneous structures. Cells are typically joined by open "windows" or holes connecting adjacent cells. Foams of the present invention made from non-HIPE emulsions typically have interconnecting channel structures rather than a well-defined cellular structure. These non-HIPE foams can have excellent ink reception capabilities.

Closed cell foams may also be made by the process of the present invention.

As used in this invention:

"actinic radiation" means photochemically active radiation including near infrared radiation, visible light, and ultraviolet light;

"cationically curable monomer" means a monomer capable of undergoing polymerization in which cationic species propagate the polymerization reaction and includes monomers containing, e.g., epoxide or vinyl ether moieties;

"collapse" means an open-cell foam is in effect transformed to either a closed cell material or a solid, voidless, polymeric sheet or polymer composite, which is mostly transparent, due to melting and solidification of most of the structure;

"effective glass transition temperature" means the actual, measurable glass transition temperature of a polymer or copolymer containing a plasticizer;

"ethylenically unsaturated" means a monomer having a carbon-carbon double bond in its molecular structure;

"foam" means an open- or closed-cell porous material having a dimensionally long range microstructure comprising cells or voids and interconnecting polymer regions; it does not mean a polymer film having holes;

"functional group" means a chemical entity capable of undergoing a non-polymerization reaction;

"HIPE" or "high internal phase emulsion" means an emulsion comprising a continuous reactive phase, typically an oil phase, and a discontinuous or co-continuous phase immiscible with the oil phase, typically a water phase, wherein the immiscible phase comprises at least 74 volume percent of the emulsion;

"homogeneous composition" means having a uniform distribution of chemical components when examined on a scale of 0.5 micrometers;

"immiscible phase" means a phase in which the polymerizable materials have limited solubility; the immiscible phase may be discontinuous, or co-continuous with the reactive phase;

"monofunctional" means a polymerizable material with only one chemical moiety that is susceptible to polymerization; monofunctional materials do not in effect participate in crosslinking;

"monomer" means chemical species capable of polymerizing, it includes monomers and oligomers;

"near infrared" means actinic radiation having a spectral output between about 800 to about 1200 nanometers;

"no effective amount of crosslinking agent" means having a concentration of crosslinking agent that is insufficient to cause the foam to crosslink and consequently resist collapse upon being subjected to heat and optionally pressure or resist dissolving in the presence of solvents;

"open cell" means a foam wherein the majority of adjoining cells are in open communication with each other; an open cell foam includes foams made from co-continuous emulsions in which the cell structure is not clearly defined, but there are interconnected channels creating at least one open, but tortuous, pathway through the foam;

"photoinitiator" means a chemical added to selectively absorb actinic radiation and generate reactive centers such as free radicals and cationic species;

"plasticizer" means a material that is mixed into an emulsion and softens the resulting cured polymer, but is not reacted into the polymer,; it frequently depresses the glass transition temperature of the polymer;

"polymerize" or "cure" are used interchangeably in this application and indicate a chemical reaction in which monomers, oligomers, or polymers combine to form a chain;

"reactive phase" means the continuous phase which contains the monomer or reactive species that are sensitive to reactive propagating species (e.g., those having free radical or cationic centers) and can be polymerized;

"reactive surfactant" means a surfactant (i.e., emulsifier) having sufficient reactivity to undergo polymerization reactions such that it becomes part of a polymer backbone;

"redox initiating system" means an oxidizing agent that forms free radicals when it comes into contact with a reducing agent and can include a co-catalyst;

"shaping" means forming into a shape and includes pouring, coating, and dispensing;

"stable" means the composition and microstructure of the emulsion is not changing over time;

"surfactant" or "emulsifier" means an amphiphilic surface active molecule which causes sufficient comparability between reactive and immiscible phases such that an emulsion can be formed;

"thermal initiator" means a species only capable of efficiently inducing or causing polymerization or crosslinking by being exposed to heat;

"thermolysis" means the process by which a thermal initiator undergoes scission to form free radicals;

"UV" or "ultraviolet" means actinic radiation having a spectral output between about 200 and about 400 nanometers;

"visible light" means actinic radiation having a spectral output between about 400 to about 800 nanometers;

"void" means any open space, in a foam, such as open cells, closed cells, and interstices;

"water-in-oil emulsion" means an emulsion containing a continuous oil phase and a discontinuous water phase; the oil and water phases may be co-continuous in some cases;

"window" means an intercellular opening.

An advantage of at least one embodiment of the present invention is that the photopolymerization process may be completed in seconds.

An advantage of at least one embodiment of the present invention is that the redox polymerization process may be completed in minutes.

An advantage of at least one embodiment of the present invention is that fast polymerization processes allow the use of emulsion compositions that cannot remain stable for extended lengths of time.

An advantage of at least one embodiment of the present invention is that a broad spectrum of foam physical properties can be generated by manipulating the type of monomers and co-monomers, the monomer to co-monomer ratio, cell size, percentage of open cells, density of the foam, and mixing methods.

An advantage of at least one embodiment of the present invention is that salts in the water phase of the emulsion are not necessary to provide lengthy stability during emulsification and polymerization. This also eliminates the need to wash away excess salts after polymerization.

An advantage of at least one embodiment of the present invention is that thin foam articles can be produced directly by the present method as opposed to having to cut thin articles from the products of a batch thermal polymerization process. An advantage of at least one embodiment of the present invention is that foams having a wide range of cell and window sizes can be obtained because the method of the present invention allows foams to be made from emulsions that are stable for as little as one minute or less.

An advantage of at least one embodiment of the present invention is that the foam materials are suitable for ink reception.

An advantage of at least one embodiment of the present invention is that multilayer articles comprising one or more foam layers may be made.

An advantage of at least one embodiment of the present invention is that articles comprising regions, i.e., areas, having foams that differ in composition or density may be made.

An advantage of at least one embodiment of the present invention is that the foams may be made by a continuous process.

An advantage of at least one embodiment of the present invention is that the non-crosslinked porous foam materials can be melted such that the cell structure collapses to form a continuous clear film. This melting can be done after ink has been applied to these materials thereby sealing the ink into the material and providing an image with increased durability. This allows for the production of useful products comprising printed images, for example, ink jet substrates such as identification cards.

Other features and advantages of the invention will be apparent from the following drawings, detailed description, and claims.

DETAILED DESCRIPTION

Polymeric foams of the present invention may be made from HIPES (High Internal Phase Emulsions). Emulsions having co-continuous reactive and immiscible phases, may also be used to make foams of the present invention, e.g., a water-in-oil emulsion with a water to oil ratio of less than 3:1. Although water is typically used as the immiscible phase, any fluid that is a liquid at operating conditions and is substantially immiscible with the oil (reactive) phase components could be used. Having a non-aqueous immiscible phase allows the use of water-soluble (not merely hydrophilic), ethylenically-unsaturated reactants in the reactive phase. Additionally, a nonaqueous immiscible phase can enable water-sensitive polymerization methods, such as cationic polymerization.

The relative amounts of immiscible and reactive phase components used to form the emulsions of the present invention, among many other parameters, is important in determining the structural, mechanical, and performance properties of the resulting polymeric foams. The immiscible to reactive phase volume ratio can influence foam characteristics such as density, cell size, cell structure, and dimensions of struts that form the foam structure. The density and microstructure of the foam also depend on aspects of the emulsion-making process (rate of immiscible phase addition to the reactive phase, agitation method, etc.).

The emulsions may also be applied onto or into materials before polymerization so that the reactive phase of the emulsion polymerizes in and around the material, thus incorporating the material into the foam structure. The incorporated materials can provide the foam with strength and other desirable properties. Suitable materials include porous or open-weave materials such as woven, nonwoven, fibrous, and particulate materials, including scrims. The foams may also be coated, and polymerized, on nonporous materials such as paper, polymer, metal materials, and microstructured substrates.

Polymerization systems may be cationic or free radical. Polymerization can be carried out with photoinitiators, thermal initiators, or redox initiating systems. For cationic polymerizations, it is often useful to illuminate the emulsion with UV or visible light (starting the photopolymerization by activating a catalyst) and follow this activation step with some heating. The propagating species in cationic polymerizations are much longer-lived than those in free radical polymerizations, and can continue to propagate without illumination (i.e., during the heating step). The benefit of conducting a post-heating step on foams made from cationically polymerizing materials is that the reactivity of the materials (e.g. epoxies) is supplemented by heating. Additionally, higher temperatures will provide greater diffusion in a polymerizing system, leading to increased levels of monomer conversion. Enhancements in physical properties are usually produced by post-heating cationically polymerizing systems that were first activated through photopolymerization. These effects can also be produced by maintaining elevated temperatures during the photopolymerization process, and not conducting a separate post-heating step at the end. The reactive species in free radical polymerizations are typically much shorter lived than in cationic polymerizations and do not continue to propagate once the light source is removed. Like cationic polymerizations, free radical polymerizations can also be driven to higher levels of conversion if they are maintained at elevated temperatures during the photopolymerization step. In the current invention, however, some of the emulsion compositions (containing free radically polymerizable materials) are unstable at elevated temperatures, and in these cases it is undesirable to deliberately increase the temperature of the emulsion system before or during the photopolymerization. In the present invention, it is important to maintain the foam at temperatures less than the effective glass transition temperature of the polymerized foam to minimize its tendency to collapse (unless collapse is desired).

Once the emulsions are formed, they may be polymerized by exposure to actinic radiation, e.g., ultraviolet and visible radiation. In photopolymerizable emulsions of the present invention, the photoinitiating specie(s) may be present in either phase.

Some of the emulsions of the present invention can be photopolymerized rapidly. They may be polymerized in less than one hour, preferably less than 10 minutes, more preferably less than 30 seconds, still more preferably less than 10 seconds, and most preferably less than 1 second. This rapid polymerization can allow a wide variety of compositions to be used due to the reduced need for emulsion stability. Because polymerization can occur quickly with the photopolymerization method of the present invention, an emulsion need only be stable for a short period of time, e.g., up to several minutes.

The emulsions may additionally, or alternatively, include a thermal or redox initiating species. The thermal initiator may be present in either the reactive or immiscible phase; the redox initiating system preferably has components in both phases. In a redox initiated polymerization, the oxidant may be in either phase, and the reducing agent is preferably in the phase that does not contain the oxidant.

The emulsions may be polymerized by exposure to thermal energy. If redox initiators are used, polymerization will occur when the oxidant and reducing agent come into contact with each other. The emulsions of the present invention can also be thermally polymerized, which is typically not as rapid a process as the photopolymerization described herein. Thermal polymerization can occur within minutes of heating, or it can take as long as several hours. This longer polymerization time can allow differing foam structures to be obtained by allowing the emulsion structure to decompose (thereby becoming less structured) to some extent before polymerization. Emulsions may also be both photopolymerized and thermally polymerized either simultaneously or sequentially. Emulsions may be polymerized by simultaneously or sequentially using redox and thermal initiators.

Light in the visible and/or ultra-violet range (200 to about 800 nm) is preferably used to polymerize the emulsions of the present invention. Due to the high tendency of emulsions to scatter light, it is preferable to use long wavelengths in this range because they are better able to penetrate the emulsions. Preferable wavelengths are 200 to 800 nanometers, more preferably 300 to 800 nanometers, most preferably 300 to 450 nanometers because of the availability of photoinitiators activated at these wavelengths and availability of light sources. The photoinitiators used should be able to absorb at the wavelength(s) of the light source used. The photopolymerization process of the present invention allows the production of emulsions and foams without thermal initiators or thermal initiator residue. However, for some emulsions, it may be desirable to conduct thermal and/or redox-initiated polymerization or a combination of photo and thermal, or thermal and redox-initiated, polymerizations. Thermal polymerization is convenient for emulsions containing particles, polymers, metals, scrims, pigments, dyes and other components, which could interfere with the photopolymerization reaction or light absorption. Extremely thick sections of foam can be more easily polymerized thermally or by redox.

After the foam has been polymerized, the immiscible phase fluid will typically still be present in the foam. This residual immiscible fluid may be removed by drying the foam structure. Suitable drying methods include, e.g., vacuum drying, freeze drying, drying in a thermal oven, drying with infrared lights, or a combination of these techniques. Again, because the resulting uncrosslinked foams are sensitive to heat, the lowest necessary temperature should be employed in drying and any other additional processing. Removal of the immiscible phase will typically leave an open cell foam structure. Closed cell foams may also be made according to the present invention.

The emulsions are typically prepared under low shear conditions, i.e., methods providing gentle mixing of the continuous and dispersed phases, such as shaking, using an impeller mixer or pin mixer, and using a magnetic stir bar. High shear conditions may be achieved with, a rotor stator mixer, a homogenizer, or a microfluidizer. Properties of foams of the present invention such as cell sizes, cell size distributions, and number of windows may be influenced by the agitation methods or agitation speeds used to make the emulsions. Cell sizes will also depend on factors such as the type of monomer(s) and surfactant(s) used, and the volume ratio of immiscible phase to reactive phase.

Emulsions of the present invention may be made by continuous or batch processes. Suitable apparatus for making the emulsions continuously include static mixers, rotor stator mixers, and pin mixers. Greater agitation may be achieved by increasing the speed of agitation or using apparatus designed to disperse the emulsifier more finely in the emulsion during the mixing process. Batch process emulsions may be made by mixing or shaking the combined ingredients, by hand or by machine. Greater agitation in a batch process may be achieved, by using e.g., a driven impeller mixer or a three-propeller mixing blade.

The foam microstructure can also be influenced by the amount of time elapsed between preparation of the emulsion and polymerization. Typically, as more time elapses, the emulsion begins to break down, i.e., cells coalesce and/or cell walls collapse. A foam made from an aged emulsion may have larger and fewer cells than a foam made from the same emulsion but polymerized soon after the emulsion is made. Aging the emulsion can also affect the size, number, and location of the interconnecting windows, which can alter the fluid uptake behavior of the resulting foam.

Adding a salt to the immiscible phase can change the cell window structures because it forces the lipophilic monomer out of the immiscible phase and into the reactive (oil) phase thereby improving emulsion stability. i.e., the emulsion resists breaking down into distinct layers of reactive and immiscible phases. Salts are not needed in the present invention, but may be used.

As mentioned above, a variety of mixing techniques can be used to make the emulsions of the present invention. For a given reactive-to-immiscible phase ratio, each of these mixing techniques has the potential to produce a slightly different emulsion microstructure. High shear and low shear mixing conditions can both be used. The desired microstructure will depend on the specific foam application of interest. The various microstructures will provide different properties in terms of pressure drop, fluid flow, tortuosity of the fluid path, surface area, ink wicking and fluid capacity. The ability to make many different microstructures with the same starting materials makes the process of the current invention a particularly versatile one.

Many polymeric foams of the present invention made from HIPEs are typically relatively open-celled. This means that most or all of the cells are in unobstructed communication with adjoining cells. The cells in such substantially open-celled foam structures have intercellular windows that are typically large enough to permit fluid transfer from one cell to another within the foam structure.

The substantially open-celled foam structures will have the individual cells being defined by a plurality of mutually-connected, three-dimensionally branched webs. The strands of polymeric material making up these branched webs can be referred to as struts. The struts typically form a dimensionally long-range macroscopic structure, in contrast to a loosely associated network of particles.

Closed cell foams may also be made by the process of the present invention. Whether foam cells are open or closed will largely depend on the amount of surfactant in the emulsion. This phenomenon, and the appropriate surfactant content needed to obtain a closed-cell foam, are described, for example, in Williams, J. M. and Wrobleski, D. A., *Spatial Distribution of the Phases in Water-in-Oil Emulsions. Open and Closed Microcellular Foams from Cross-Linked Polystyrene, Langmuir* Vol. 4, No. 3, 1988, 656–662.

The HIPE foams of the present invention preferably have densities of about 0.75 g/cc. Foam cells, and especially cells formed by polymerizing a monomer-containing reactive phase that surrounds a relatively monomer-free immiscible phase droplet, tend to be substantially spherical in shape. Cell sizes typically range from 1 to 200 micrometers and are preferably less than 100, more preferably less than 50, most preferably less than 20 micrometers, for most applications. The HIPE open-cell foams typically have 4 to 100 intercellular windows, preferably 2 or more, more preferably 8 or more. The windows preferably having diameters of 0.1 to 25 µm, preferably 0.1 to 10 µm. The non-HIPE foams of the present invention typically have an interconnected channel structure without clearly defined cells and cell windows. They preferably have densities of greater than 0.20 g/cc, and typically have densities of 0.25 to 0.98 g/cc.

The foam densities listed here assume oil phase components having a density of approximately 1 g/cc. If denser materials are used in the reactive phase the foam density can be greater than those listed as ranges herein.

Foam materials of the present invention having two major parallel surfaces may be from about 0.025 to about 10 mm thick, preferably about 8 mm or less. The emulsions should not be made into a shape or thickness that prevents radiation from penetrating at least halfway through it (so the emulsion can be fully photopolymerized by exposing each side). The allowable thickness will depend on the materials used, the nature of the polymerization (for example thermal polymerization methods allow for thicker foams to be made than with photopolymerization), the initiator type, and the amount of initiator used. In a photoinitiated system, decreasing the amount of photoinitiator can decrease the light absorption of the emulsion and may increase light penetration, depending on the light scattering effects of the emulsion. If scattering effects dominate, reducing the photoinitiator level will have little effect on light penetration. Foams thicker than about 8–10 mm could be made by photopolymerizing a sequence of layers, with each new emulsion layer being placed on the previously polymerized layers and being of a thickness that would allow light to penetrate through its entire depth. Alternatively an 8–10 mm foam could be made with a thermal or redox polymerization process.

Articles

The foams may be made into sheets, slabs, and other shapes. The thickness of an article can vary and may depend on process conditions such as the composition, and in the case of photopolymerization, wavelength and intensity of the curing light, and photoinitiator type and amount.

Layered articles may be made by layering the emulsion with other polymerizable or non-polymerizable materials. If photopolymerization is used, the materials need to be sufficiently transparent to the wavelength absorbed by the photoinitiator in the emulsion, or so long as the foam comprises an outer layer of a structure such that the emulsion can be fully penetrated by a sufficient amount of the radiation at the wavelength being used. For thermally or redox polymerized articles, light absorption and transparency of layers is not a limiting factor. Multilayer articles may also be made by post-production processes such as laminating. The layered articles may have a myriad of different properties depending on the composition, bulk density, cell sizes, window sizes, etc. of the foams. The layers may differ by more than 20% with respect to, for example, content of a particular component and density.

Multi-regional articles may be made by a number of methods. They may be made by adding pieces of polymerized foam to an emulsion that is subsequently cured. They may also be made by carefully mixing two or more emulsions prior to curing. The different regions or areas in the resulting foam article may differ with respect to composition, density, color, or other properties.

When used for fluid absorption, most preferred polymeric foams are sufficiently hydrophilic to permit the foam to absorb aqueous fluids. The level of hydrophilicity can depend on the starting material. Foams created from an emulsion having a non-water immiscible phase and monomers that are water soluble would be very hydrophilic and can take up water better than foams made with water insoluble monomers. Hydrophilicity may also be modified by post-production processes known in the art.

The fluid handling properties of a foam can be related to the foam's capillary structure. Foams having larger cell and window sizes tend to acquire fluid quickly but do not distribute fluid sufficiently against the force of gravity, nor do they store fluid effectively. Conversely, foams having smaller cell and window sizes are able to wick fluid against the force of gravity and store the fluid tightly, but are typically slower to acquire fluid.

The open-cell foams of the present invention have good ink reception capabilities. The foams can be treated with an ink receptive solution that aids the binding, coagulation, and flocculation of inks as they are applied to the foam. The ink receptor solution helps to increase the image resolution that can be achieved with the open-cell foams of the present invention. While the materials of the present invention are very good ink receptors, without something to bind the ink to the material, the colors tend to spread and run, thereby reducing image resolution especially in ink-dense areas. The printer, inks, and porous structure determine the composition of the ink receptor solution that will improve the image quality. Foams with appropriate functional groups built into the polymeric material may also function in the same manner as the ink receptive solution treated foams.

After ink has been applied, the foams can be collapsed by subjecting the foams to heat and/or pressure. The heat and optionally pressure causes the polymer comprising the foam to melt and seal, i.e., encapsulate, the ink into the resulting polymer film. The encapsulated ink provides a durable image.

In addition, patterned foam articles can be produced by shaping and curing the emulsion while in contact with a microstructured surface. After curing, the foam is separated from the microstructured surface and the foam retains the geometrical pattern of the surface. These conventional techniques are described in U.S. Pat. No. 5,691,846, incorporated by reference. The microstructured surface can be chosen from a wide variety of geometrical shapes that include cavities, channels, posts, or profiles. The pattern can be selected depending on the desired use of the foam.

Emulsion

Reactive Phase

The continuous (reactive) phase of an emulsion of the present invention comprises monomers that form the polymer matrix, or struts, of the foam structure after polymerization. The reactive phase comprises at least one polymerizable material, and at least one emulsifier. The polymerizable material and the emulsifier may be the same material, as in the case where the emulsifier is a reactive surfactant. A reactive surfactant may make a foam more hydrophilic or hydrophobic, depending on its structure. A photoinitiator, thermal initiator, or redox initiator may also be present in the reactive phase.

Selection of particular types and amounts of monomers, optional comonomers, and emulsifiers can be important in obtaining a foam having the desired combination of structural, mechanical, and fluid handling properties to render the foam materials suitable for their intended uses. The components of the reactive phase should be substantially insoluble in the immiscible phase. Additives, including materials that do not participate in the polymerization reaction, can also be included in the reactive phase.

Polymerizable Material

The polymerizable material component comprises one or more mono-functional monomers that may be photo-, thermally-, or redox polymerized. If the immiscible phase is water, the polymerizable material should be an ethylenically unsaturated substantially water-insoluble monomer. If the immiscible phase is nonaqueous, the polymerizable material may be a cationically-curable monomer, an ethylenically unsaturated monomer, or a water-soluble monomer. Suitable ethylenically unsaturated monomers include, for example, monofunctional alkyl acrylates such as isobornyl acrylate, stearyl acrylate, butyl acrylate, n-butyl acrylate, hexyl acrylate, octyl acrylate, isooctyl acrylate, 2-ethylhexyl acrylate, nonyl acrylate, isononyl acrylate, decyl acrylate, dodecyl (lauryl) acrylate, isodecyl acrylate, tetradecyl acrylate; aryl and alkaryl acrylates such as benzyl acrylate and nonylphenyl acrylate, the ($C_4$–$C_{16}$) alkyl methacrylates such as methacrylic acid, hexyl methacrylate, octyl methacrylate, nonyl methacrylate, isononyl methacrylate, decyl methacrylate, isodecyl methacrylate, dodecyl (lauryl) methacrylate, tetradecyl methacrylate; acrylamides such as N-octadecyl acrylamide, and substituted acrylamides. Other ethylenically-unsaturated monomers that will copolymerize with acrylates may also be used. Suitable types of co-monomers include maleimides and azlactones. Other suitable monomers include isoprene, butadiene, 1,3-pentadiene, 1,3,7-octatriene, and β-myrcene. Other mono-functional acrylate monomers can also be used including polyester acrylates, urethane acrylates, and acrylates of epoxidized oils. Combinations of any of these monomers may also be used.

If the immiscible phase is non-aqueous, monomers that are difficult to polymerize in the presence of water, e.g., cationically-curable monomers and water-soluble or highly hydrophilic monomers, may be used in the reactive phase. Suitable cationically-curable monomers include those containing epoxide or vinyl ether functional groups. Suitable water-soluble or hydrophilic monomers include poly(ethylene glycol) acrylates of various molecular weights. The monomers listed above for aqueous emulsions may also be used with an emulsion having a non-aqueous immiscible phase. The polymerizable material may also include reactive surfactants.

These foams are made with no effective crosslinking agent. This means that the foams will not resist collapse when subjected to heat and optionally pressure, and will not resist dissolving when contacted with a solvent. The maximum allowable crosslinker concentration will depend on the components of the reactive phase.

The polymerizable material component may comprise between 50 and 99, preferably 80 to 95, weight percent of the reactive phase.

Emulsifiers

Emulsifiers are also a component of the reactive phase of emulsions in the present invention. Emulsifiers can sometimes act as plasticizers. Suitable emulsifiers include reactive surfactants and non-reactive surfactants. Reactive surfactants, having ethylenically unsaturated bonds, can participate in the polymerization of the polymerizing materials in the reactive phase and thereby become part of the foam structure. Emulsifiers with an epoxy or polyol functionality could be used as a reactive surfactant in cationically polymerizable systems. Reactive surfactants are typically preferred over non-reactive surfactants because they are less likely to leach out of the resulting foam article during use. This can be particularly beneficial in applications where the foam comes into contact with skin. Additionally, reactive surfactants will reduce the tendency for the emulsifier to depress the effective glass transition temperature of the polymer comprising the foam.

In a water-in-oil emulsion, the emulsifier preferably has a hydrophilic to lipophilic balance (HLB) of 3 to 14, usually 4 to 6, depending on the monomer(s) used.

Suitable classes of non-ionic emulsifiers for water-in-oil emulsions include polyoxyethylenated alkylphenols, polyoxyethylenated straight-chain alcohols, polyoxyethylenated polyoxypropylene glycols, polyoxyethylenated mercaptans, long-chain carboxylic acid esters, alkanolamine condensates, tertiary acetylenic glycols, polyoxyethylenated silicones, N-alkylpyrrolidones, fluorocarbon liquids, and alkylpolyglycosides. Specific emulsifiers most suited to water-in-oil emulsions include sorbitan monoleate, glycerol monoleate, polyethylene glycol (200 molecular weight) dioleate, Castor oil, glycerol monoricinoleate, distearyl dimethylammonium chloride, dioleyl dimethylammonium chloride, and bis-tridecyl sulphosuccinic acid (sodium salt). Cationic and anionic surfactants can also be used as emulsifiers in this invention. When the immiscible phase is non-aqueous, other classes of emulsifiers, such as fluorocarbonsurfactants, are available in addition to those listed above. In cases of cationic polymerization, it is preferable to use a non-ionic surfactant to avoid interfering with the polymerization reaction.

Suitable reactive surfactants for the water-in-oil emulsions include methoxypoly(ethyleneoxy) ethyl acrylate having 1 to 40 oxyethylene groups, alkylene polyalkoxy sulfate (MAZON SAM 211-80, BASF, Mount Olive, N.J.), and copolymerizable alkoxy surfactant (MAZON SAM-185, BASF, Mount Olive, N.J.). The emulsifiers listed at col. 20, lines 55 et seq, and col. 21–22 of U.S. Pat. No. 5,856,366 may also be used in the present invention. Reactive surfactants are preferable for the foams of the present invention because of the reduction in their ability to plasticize the polymer network and cause depression of the glass transition temperature of the polymer comprising the foam. These same emulsifiers and surfactants, as well as others, can be used when the immiscible phase is nonaqueous.

Non-polymerizable emulsifiers typically comprise up to 30 weight percent of the reactive phase. Polymerizable emulsifers may comprise up to 100% of the reactive phase.

Photoinitiators

Photoinitiators can rapidly and efficiently respond to a light source with the production of radicals and other species that are capable of initiating a polymerization reaction. Preferably the photoinitiators used in the present invention absorb at wavelengths of 200 to 800 nanometers, more preferably 300 to 800 nanometers, most preferably 300 to 450 nanometers. The photoinitiator provides a convenient trigger for the polymerization reaction. If the photoinitiator is in the reactive phase, suitable types of oil-soluble photoinitiators include benzil ketals, α hydroxyalkyl phenones, α amino alkyl phenones, acylphospine oxides. Specific initiators include 2,4,6-[trimethylbenzoyldiphosphine] oxide in combination with 2-hydroxy-2-methyl-1-phenylpropan-1-one (50:50 blend of the two is sold by Ciba Geigy as DAROCUR 4265); benzil dimethyl ketal (sold by Ciba Geigy as IRGACURE 651); α, αdimethoxy-α-hydroxy acetophenone (sold by Ciba Geigy as DAROCUR 1173); 2-methyl-1-[4-(methyl thio)phenyl]-2-morpholino-propan-1-one (sold by Ciba Geigy as IRGACURE 907); Oligo [2-hydroxy-2-methyl-1-[4-(1-methylvinyl)phenyl]propanone] (sold as ESACURE KIP EM by Lamberti s p a); Bis(2,4,6-trimethylbenzoyl)-phenylphosphineoxide (sold by Ciba Geigy as IRGACURE 819). Other suitable initiators are those disclosed in U.S. Pat. No. 5,545,676, PCT/US98/04458, and PCT/US98/04029, all of which are incorporated by reference.

Photoinitiators may comprise between 0.05 and 10.0, preferably between 0.2 and 10, weight percent of the reactive phase. Lower amounts of photoinitiator allow light to better penetrate the emulsion, which can provide for polymerization deeper in the foam layer. However, there must be enough initiator to initiate the polymerization and overcome oxygen inhibition. Further, light scattering by the emulsion, which also affects light penetration depth, is not affected by photoinitiator concentration.

Thermal Initiators

Thermal initiators can be used instead of, or in addition to, photoinitiators in the emulsion systems of the present invention. The thermal initiator could be present in either the reactive or immiscible phase, and can be included independently of the photoinitiator (in systems meant for thermal polymerization only).

Thermal initiators generally undergo homolytic scission to form free radicals under application of heat. There are many compounds that undergo thermolysis to form free radicals in the convenient 40° C. to 100° C. range. Thermal initiators suitable for the present invention include inorganic persulfates and azo compounds. Organic peroxides may also be used, but have a tendency for hydrogen abstraction leading to some crosslinking. The inorganic persulfates such as ammonium persulfate, potassium persulfate and sodium persulfate are water soluble, as are azo compounds such as 4,4'-azobis(4-cyanopentanoic acid), 2,2'-azobis(N,N'-dimethyleneisobutyramidine), 2,2'-azobis(2-amidinopropane) dihydrochloride and 2,2'-azobis(N,N'-dimethyleneisobutyramidine)dihydrochloride, while other azo compounds such as 2,2'-azobis(isobutyronitrile) and 2,2'-azobis(2-methylbutyronitrile) are oil soluble. Other suitable thermal initiators are described in U.S. Pat. No. 3,255,127 and U.S. Pat. No. 5,260,345, both incorporated by reference. Thermal initiators may comprise between 0.1 and 10.0, preferably between 0.2 and 5, weight percent of the reactive phase.

Redox Initiators

Redox initiating systems typically comprise an electron donor and an electron acceptor molecule. The rate of radical generation is greatly accelerated when the donor and acceptor are coupled with a reducing agent and/or co-catalyst. These initiating systems, which are typically include thermal initiators, undergo very fast redox reactions producing a high flux of free radicals regardless of reaction temperature. Redox initiating systems suitable for the present invention include azo/ascorbic acid, azo/ascorbic acid/iron (II), persulfate/bisulfite, persulfate/hydrosulfite, peroxide/iron (II), peroxide/ascorbic acid/iron (II) and persulfate/bisulfite/copper (I). Other suitable redox initiator systems are described in "Emulsion Polymerization and Emulsion Polymers", P. Lovell and M. El-Aasser, John Wiley and Sons (1997), and others are known in the art. In this invention, an azo/glucose/iron (II) system is preferred.

The various components of the redox intiating system can be in both phases or a single phase in the emulsions of the current invention. If both components are in a single phase, the polymerization reaction can occur very quickly. These initiating systems do not need to be exposed to heat or light to initiate the radical generation, but post-heating is sometimes required. The rate of radical generation can be controlled by the relative concentration of the reducing agent in comparison to the oxidizing agent.

Reactive Phase Additives

The reactive phase may contain inert ingredients, such as polymers that are dissolved, but do not undergo polymerization. These ingredients may add strength or toughness to the polymerized foam. Suitable polymer additives include polyisoprene, polyethylene, polypropylene, polybutadiene, poly n-vinyl pyrollidinone, and acrylic tougheners. Other suitable reactive phase additives include flame retardants, fillers, $CaCO_3$, silica, and carbon black. Additives such as binders and coagulants for inks may be included in the reactive phase to enhance image quality when the foams are used as ink receptors. The use of binders and coagulants in the reactive and/or immiscible phases might result in the added benefit that post-reaction treatment of the foam with ink receptor solution is unnecessary.

The reactive phase may also comprise materials that can incorporate subsequently reactive functional groups into the foams during their fabrication. Many functional groups can be incorporated as vinyl groups (e.g., vinyl dimethyl azlactone) or acrylate esters or other acrylate and methacrylate groups (e.g., hydroxyethyl acrylate, acrylamide, butylmethacrylates). Reactive functional groups that may be incorporated include carboxylates, amines (including primary, secondary, tertiary, and quaternary amines and polyamines), sulfhydryls, azlactones, aldehydes, epoxides, maleimide isothiocyanates, isocyanates, n-alkyl groups (e.g., butyl, octyl, and octadecyl groups), phenyl and benzyl groups, cycloalkyl groups, hydroxy and hydroxyethyl groups, amides including (acrylamides), sulfonates, sulfonamides, phosphates, polyphosphates, iminodiacetates, various bypryridyl groups, salicylates, polyethers (including crown and cryptand ethers), and cyclodextrans.

When the reactive phase contains additives, the polymerizable material(s) may comprise less than 50% of the reactive phase.

Immiscible Phase

The immiscible phase may comprise any suitable fluid that is substantially immiscible with the polymerizable material(s) in the reactive phase and is a liquid at operating conditions. The most familiar immiscible phase is water. The immiscible phase may comprise an initiator or emulsifier. The immiscible phase fluid should have a viscosity of at least 0.5 centipoise at the use temperature. The upper viscosity limit for the immiscible phase will depend on the viscosity of the reactive phase and the desired foam structure. Suitable fluids other than water include, for example, fluorocarbon liquids and organic liquids in which the reactive phase is immiscible. Using a non-aqueous discontinuous or cocontinuous phase can allow different types of reaction chemistries for polymerizing the foams. For example, cationic photopolymerization or free radical polymerization of water soluble and very hydrophilic materials.

Initiators

Photoinitiators soluble in the immiscible phase may be used in the present invention. Suitable photoinitiators include those disclosed in U.S. Pat. No. 5,545,676, incorporated by reference. The photoinitiator used should absorb light at the wavelength used to polymerize the emulsion, and should be effective for the type of polymerization used, e.g., free radical or cationic. When photoinitiators are used, the immiscible fluid should not absorb light in the same wavelength as the photoinitiator being used. Preferably the photoinitiators used in the present invention absorb at wavelengths of 200 to 800 nanometers, more preferably 300 to 800 nanometers, most preferably 300 to 450 nanometers.

Thermal initiators soluble in the immiscible phase may be used in the present invention. Suitable thermal initiators include the same classes of materials described in the reactive phase initiator section.

Redox initiators soluble in the immiscible phase may be used in the present invention. Suitable redox initiators include the same classes of materials described in the reactive phase initiator section.

A combination of photo and thermal initiators may sometimes be advantageous, particularly when additional cure is necessary. Redox initiating followed by thermal cure also provides some benefit. In such a case, the redox polymerization can fix the emulsion structure in place. Subsequent thermal energy can then drive the polymerization reaction to completion. The thermal energy supplied should be less than that required to collapse the open cell foam if it is supplied before the porous foam material is used as an ink receptor.

Salts

The photo-cured emulsions of the present invention do not require salts to stabilize the emulsion, although they may be added. Salts are desirable for thermally-cured emulsions. Salts in the immiscible phase can increase the stability of the emulsion by minimizing the tendency of monomers, comonomers, and crosslinkers that are primarily soluble in the reactive phase to partition into the immiscible phase. Suitable salts for an aqueous immiscible phase include mono-, di-, or tri-valent inorganic salts including water-soluble halides, e.g., chlorides, nitrates, and sulfates of alkali metals and alkaline earth metals such as sodium chloride, calcium chloride, sodium sulfate, and magnesium sulfate and other salts described in U.S. Pat. No. 5,352,711, incorporated by reference. Hydratable inorganic salts may also be incorporated into the foams to increase hydrophilicity. Aqueous salt solutions may be used to treat the foams after removal of, or as part of the process of removing, a residual aqueous immiscible phase from a just-polymerized foam.

Salts and other materials that act as coagulants or flocculants for inks may be desirable to include in the immiscible phase of the emulsions of the present invention. Residual salts and coagulant/flocculants could assist the retention of inks during printing operations subsequent to drying. The inclusion of these coagulants or flocculants in the immiscible phase could result in the elimination of the need for post-reaction treatment of the foam with an ink receptor solution.

When the immiscible phase is non-aqueous, salts having organic cations or anions may be used. Suitable salts include, for example, borates, trifluoromethane sulfonates (triflates), and hexafluorophosphates.

If present in an emulsion of the present invention, the salts preferably comprise less than 5 wt %, more preferably less than 1 wt % of the immiscible phase.

Immiscible Phase Additives

The immiscible phase may contain additives such as ion exchange beads, polymer particles, fibers, and organic and inorganic particulates. If the immiscible phase is removed after polymerization, these additives may remain in the foam by coating onto the interior surfaces of the foam cells or structure through physical entrainment or through deposition during immiscible phase removal. For example, evaporation can leave salts behind. Soluble species, such as polymers, might also be added to the immiscible phase to provide enhanced mechanical or other desirable properties to the emulsion or the polymerized foams, or improved ink reception, coagulation, or flocculation. Insoluble additives such as particulates could be retained in the porous structure of the foam after removal of the immiscible phase. These particulates can also enhance ink reception capabilities by aiding in ink binding, flocculation, and coagulation.

Emulsion Additives

The emulsion may also include additives that are not soluble in either the reactive or immiscible phase. Examples of suitable additives include ion exchange beads, fibers, inorganic particles, other foams, as described in U.S. Pat. No. 5,037,859, incorporated by reference, pigments, dyes, carbon black, reinforcing agents, solid fillers, hydrophobic or hydrophilic silica, calcium carbonate, toughening agents, flame retardants, antioxidants, finely ground polymeric particles (e.g., polyester, nylon, polypropylene, or polyethylene), expandable microspheres, glass beads, stabilizers (e.g., UV stabilizers), and combinations thereof.

The additives may be added in amounts sufficient to obtain the desired properties for the foam being produced. The desired properties are largely dictated by the intended application of the foam or foam article. The additives should be selected such that interference with photopolymerization is minimized.

For the uncrosslinked foams described herein, the chosen polymerizing system needs to provide an adequately high glass transition temperature such that the foams do not collapse as a result of the polymerization method or the removal of the immiscible phase. As previously noted, a surfactant can act as a plasticizer in the polymer comprising the foam. The surfactant can thus effect a reduction in the effective glass transition temperature of the polymer. The use of a reactive surfactant, which polymerizes into the polymer backbone, could reduce this tendency.

This invention may be illustrated by way of the following examples.

EXAMPLES

Test Methods

Scanning Electron Microscope

The SEM micrographs were taken with either a JEOL 35C or a JEOL Model 840 SEM (Peabody, Mass.). Foam samples were dried and sputter coated with either gold or a gold/palladium (60/40) mixture, and the sample surface was imaged.

Example 1

Example 1 illustrated the effect of Glass Transition Temperature (Tg) on the tendency of the uncrosslinked foams to prematurely collapse.

Six different sample mixtures (1A–1F) of isobornyl acrylate (IBOA), available as SR506 from Sartomer Co., Exton, Pa., and 2-ethylhexylacrylate (2EHA), available from Aldrich Chemical Company, Milwaukee, Wis., were prepared to examine the effect of combining a lower Tg monomer (2EHA, Tg of 223° K.) with a higher Tg monomer (IBOA, Tg of 361° K.). In addition to the two monomers, an emulsifier (sorbitan monooleate—SMO, available from Aldrich), and a photoinitiator (Darocur 4265, available from Ciba Geigy, Hawthorne, N.Y.) were added. This mixture was emulsified by adding water dropwise to the mixture under constant agitation with a Jiffy Stir mixer at 600 rpm. After water addition was complete, the emulsion was agitated for an additional 1–2 minutes, then coated with a notched-bar coater onto silicone-coated PET release liner designated as T-10, single-sided film from CPFilms, Martinsville, Va., at a wet thickness of about 178 microns (7 mils). Each sample was polymerized by passing it at 35 fpm through an ultraviolet belt processor equipped with a single Fusion F600D lamp at 100% power in focus. Following illumination, the samples were allowed to lie flat on counter surfaces overnight to dry. The compositions of Sample 1A–1F, after drying, are shown in Table 1. In the Reactive Phase Components columns, wt % refers to the weight percent of the reactive phase on a water-free basis. The water column describes the amount of water added to the reactive phase mixture. The total reactive phase column details the weight and wt % of the emulsion that is the reactive phase.

Sample 1A–1C, with the three highest concentrations of IBOA, remained as opaque porous films after drying overnight. Samples 1D–1F collapsed to form transparent films. To each of the monomer mixtures described below, 52 grams of water were added. This produced an approximate porosity of 75% for each of the samples.

TABLE 1

| | Reactive Phase | | | | | | | | | Total Reactive Phase | | Water | |
|---|---|---|---|---|---|---|---|---|---|---|---|---|---|
| | IBOA | | 2EHA | | SMO | | D-4265 | | | | | | |
| Ex. | (g) | wt % | (g) | wt % | (g) | wt % | (g) | wt % | (g) | wt % | (g) | wt % |
| 1A | 14.48 | 83.8 | 0.00 | 0.0 | 2.26 | 13.1 | 0.55 | 3.2 | 17.29 | 25 | 52.00 | — |
| 1B | 13.95 | 80.8 | 0.53 | 3.1 | 2.26 | 13.1 | 0.53 | 3.0 | 17.27 | 25 | 52.00 | — |
| 1C | 13.18 | 76.4 | 1.32 | 7.7 | 2.23 | 12.9 | 0.53 | 3.0 | 17.26 | 25 | 52.00 | — |
| 1D | 11.71 | 68.1 | 2.76 | 16.0 | 2.21 | 12.8 | 0.53 | 3.1 | 17.20 | 25 | 52.00 | — |
| 1E | 9.99 | 57.9 | 4.48 | 26.0 | 2.23 | 12.9 | 0.55 | 3.2 | 17.25 | 25 | 52.00 | — |
| 1F | 9.07 | 52.3 | 5.47 | 31.5 | 2.24 | 12.9 | 0.57 | 3.3 | 17.35 | 25 | 52.00 | — |

After polymerization, sample 1B was allowed to remain at room temperature for 12–14 hours during which time the water (immiscible phase) evaporated from the sample. After this initial drying, sample 1B was coated with an ink receptor solution (composition contained in Table 2 below), and dried gently with a hot air gun. After the ink receptor solution dried, the sample was run through an Epson pigmented ink printer and printed in reverse with an identification card image on the foam surface. The ink was allowed to dry and the printed material was placed in contact with vinyl identification cardstock. The cardstock with the imaged film was placed inside a jacket and sent through a small passport-type laminator that provided heat and pressure. The laminator had two sequential heating areas, one set at 135° C. (275° F.) and the second at 157° C. (315° F.). After the lamination step, the jacket was opened and the liner was stripped away leaving an identification card with a good quality image transferred to the card.

TABLE 2

Ink Receptor Solution

| Component | Wt % |
|---|---|
| Copolymer Solution* | 23.3 |
| hydroxy isophthalic acid | 1.0 |
| $Al_2(SO_4)_3$** | 1.0 |
| Ethanol | 25.0 |
| Water | 49.7 |

*Copolymer Solution is a copolymer of polyvinylpyrrolidone-co-acrylic acid-co-dimethyl amino ethyl acrylate methyl chloride salt dissolved at 21.6 wt % solids in a 3:1 ethanol:water solution.
**$Al_2(SO_4)_3$ is supplied by General Chemical Company as a food grade hydrated salt Samples 1A and 1C were similarly printed and laminated. Sample 1A produced the same result. A good quality image was obtained on the card after the porous coating was melted/collapsed.

Sample 1C did not provide an image with as high a quality as Samples 1A and 1B. This is believed to be caused by a partial collapse of the foam structure upon drying due to the polymer having an effective Tg too close to room temperature. This resulted in an apparent reduced porosity of the foam layer, reducing the foams ability to absorb the ink.

Figure 1A:
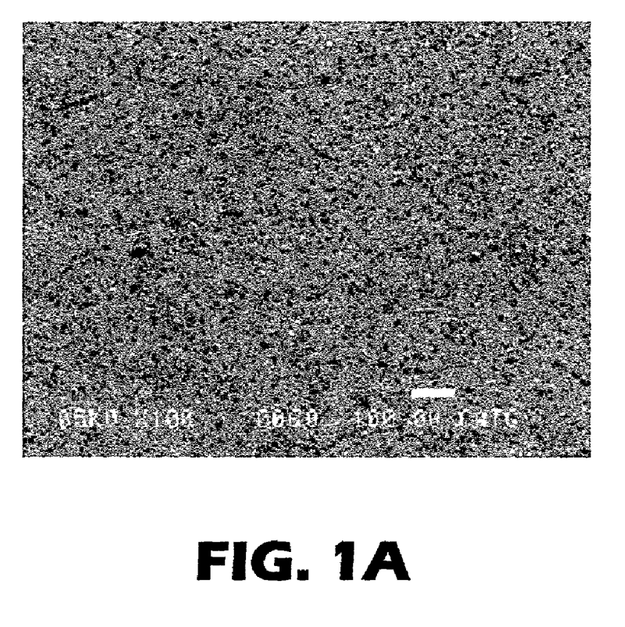
FIGS. 1A and 1B show scanned electron microscope (SEM) digital image micrographs of the surface of Sample 1A at magnifications of 100× and 500×, respectively.
Figure 1B:
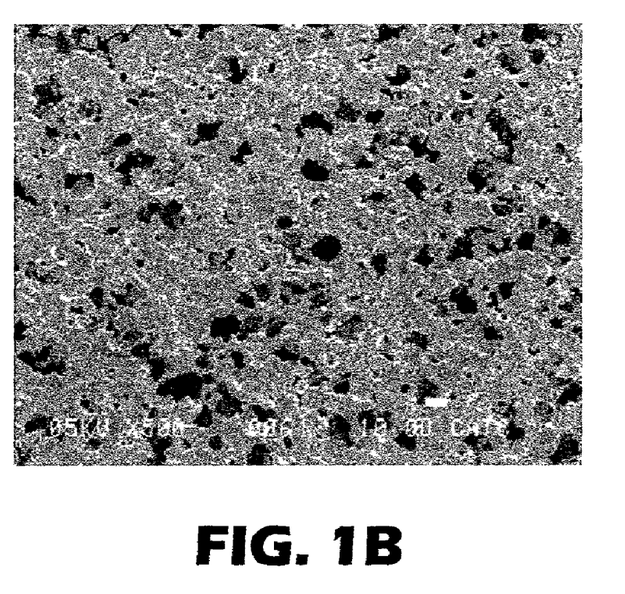
Figure 2A:
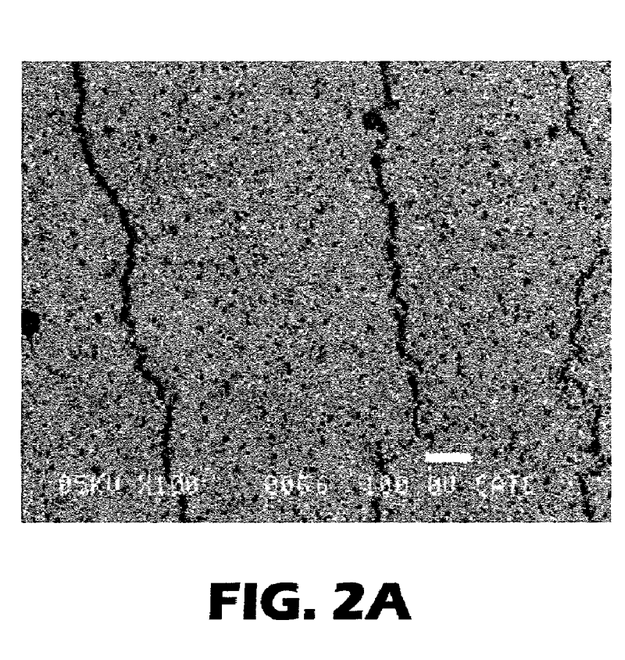
FIGS. 2A and 2B show SEM digital image micrographs of the surface of Sample 1B at magnifications of 100× and 500×, respectively.
Figure 2B:
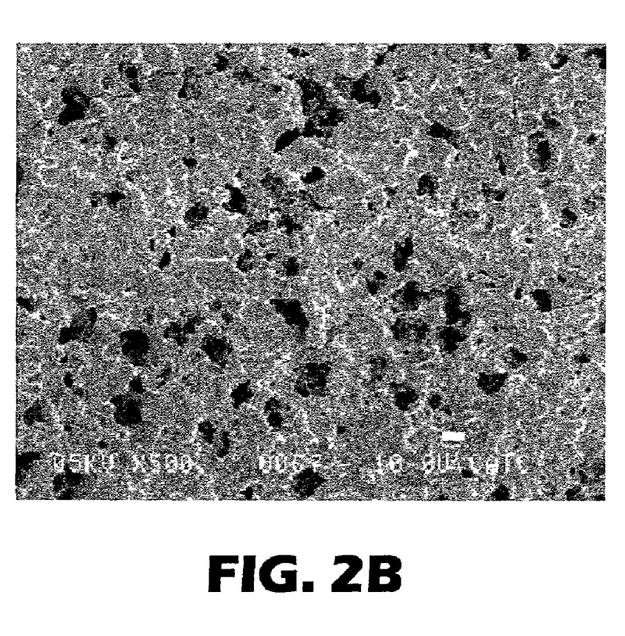
Figure 3A:
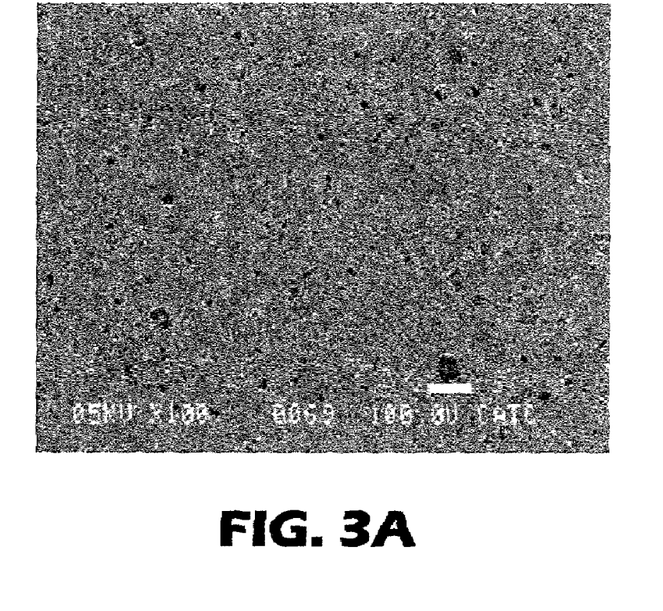
FIGS. 3A and 3B show SEM digital image micrographs of the surface of Sample 1C at magnifications of 100× and 500×, respectively.
Figure 3B:
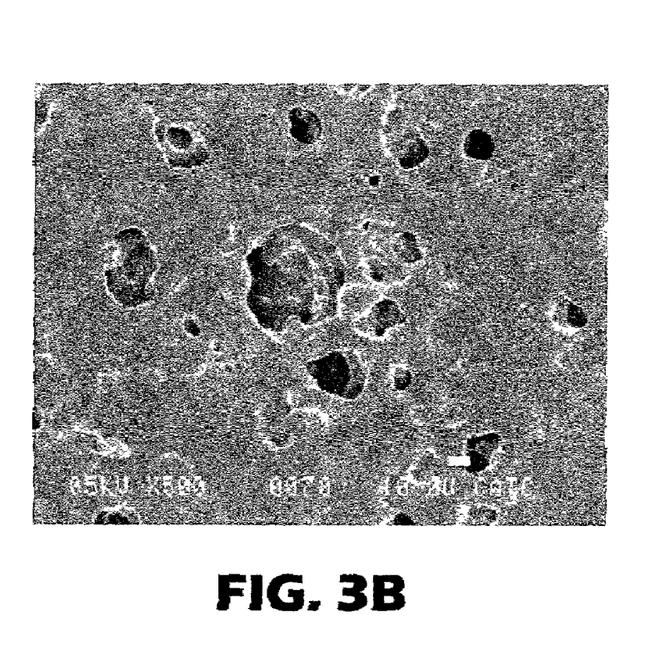

Partial collapse of foam structure in Sample 1C, is seen by examination of FIGS. 3A and 3B. FIGS. 1A and 1B, 2A and 2B, and 3A and 3B show Scanning Electron Micrographs (SEMs) at magnifications of 100× (A) and 500× (B) before ink is applied to the surface of Samples 1A, 1B, and 1C, respectively. Comparison of the figures show a relative reduction in porosity of the surface of Sample 1C, due to a partial collapse of foam, compared to that of Sample 1A and 1B.

The foam structure of Sample 1D–1F collapsed upon drying, and therefore were not imaged or transferred.

Example 2

Example 2 describes foams made from different polymerizable materials.

Three different sample mixtures (2A–2C) were prepared, coated, polymerized and dried as described in Example 1 except stearyl acrylate (Tg of 308° K. and available as SR257 from Sartomer, Exton, Pa.) was used in place of 2-EHA. The monomer mixtures for Samples 2A–2C are listed in Table 3.

TABLE 3

| | Reactive Phase Components | | | | | | | | Total Reactive Phase | | Water | |
|---|---|---|---|---|---|---|---|---|---|---|---|---|
| | IBOA | | SR257 | | SMO | | D-4265 | | | | | |
| Ex. | (g) | wt % | (g) | wt % | (g) | wt % | (g) | wt % | (g) | wt % | (g) | wt % |
| 2A | 13.83 | 79.0 | 0.74 | 4.2 | 2.42 | 13.8 | 0.51 | 2.9 | 17.49 | 25 | 52.00 | — |
| 2B | 12.59 | 72.6 | 1.92 | 11.1 | 2.28 | 13.1 | 0.55 | 3.2 | 17.34 | 25 | 52.00 | — |
| 2C | 9.84 | 56.9 | 4.67 | 27.0 | 2.25 | 13.0 | 0.53 | 3.1 | 17.29 | 25 | 52.00 | — |

Sample 2A remained opaque after drying, while Sample 2B and 2C both collapsed to transparency upon drying. Sample 2C was a clear sticky film after drying.

Figure 4A:
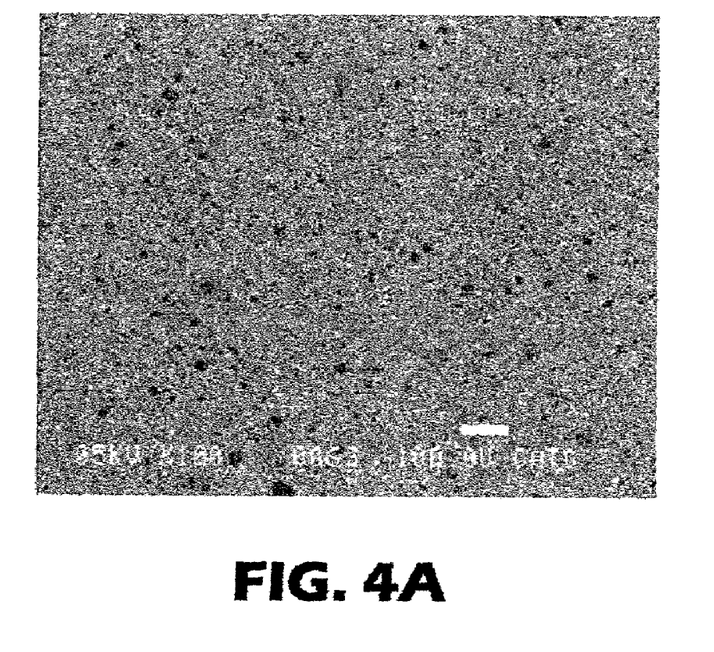
FIGS. 4A and 4B show SEM digital image micrographs of the surface of Sample 2A at magnifications of 100× and 500×, respectively.
Figure 4B:
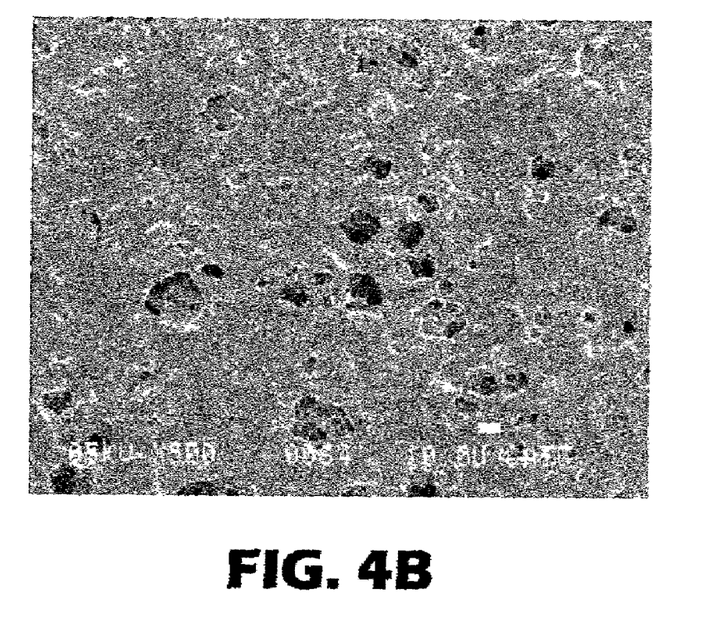

Sample 2A was imaged as described in Example 1 with generally good image quality. The reverse-printed image was transferred onto PETG cardstock and the printings on the cardstock were still visible through the collapsed, printed sample. FIGS. 4A and 4B shows SEM images of the surface of Sample 2A at 100× and 500×, respectively.

Effective Glass Transition Temperature Values for Examples 1 and 2

Measurements of the Tg of samples from Examples 1A, 1B, 1C, 2A, 2B, and 2C were performed using a Modulated Differential Scanning Calorimeter. The samples were subjected to two heating cycles and one cooling cycle. The recorded values of Tg obtained from each of three cycles (first heat, first cool, and second heat) are included in Table 4 for each sample. The Second Heat Tg is believed to best represent the material properties of the foam.

TABLE 4

| Example | First Heat Tg, °C. | Cool Tg, °C. | Second Heat Tg, °C. |
|---------|--------------------|--------------|---------------------|
| 1A | 42 | 39 | 37 |
| 1B | 38 | 33 | 36 |
| 1C | 31 | 29 | 30 |
| 2A | 38 | 34 | 34 |
| 2B | 20 | 17 | 19 |
| 2C | −13 | −19 | −9 |

Because of sufficient foam structure stability during drying, satisfactory image quality was achieved with polymerized foams having a Tg of at least 30° C. Preferably the Tg is at least 33° C., more preferably at least 35° C. Samples 1C, 2B, and 2C exhibited partial or total collapse during drying indicating they did not have adequate porosity to retain a good quality printed image.

Example 3

This example illustrates a stable polymerized emulsion-based foam structure made by thermal polymerization.

In a glass jar, 4.0 g of SMO along with 0.4 g of azo-bis-isobutyrlnitrile (available as Vazo 64 from DuPont, Wilmington, Del.) was dissolved in 70.0 g of isobornyl acrylate. In a separate container, 0.4 g of ferrous sulfate heptahydrate and 0.4 g of glucose were dissolved in 140.0 g of deionized water. The ferrous sulfate-glucose solution was added dropwise to the acrylate mixture while mixing. The resultant mixture formed a viscous water-in-oil emulsion that was subsequently placed under vacuum for 8 hours, followed by heating to 60° C. until the sample solidified in the glass jar. The solidified material was porous in nature.

Other embodiments of the invention are within the scope of the following claims.

What is claimed is:

1. A process for making an uncrosslinked polymeric foam comprising:
    a) mixing a reactive phase comprising at least one polymerizable material comprising a monomer containing a reactive functional group, the polymerizable material having an effective glass transition temperature sufficient to permit the formation of a stable foam upon polymerization of the material and subsequent removal of an immiscible phase with no effective amount of crosslinking agent and at least one emulsifier with at least one photoinitiator system and a liquid immiscible with the reactive phase to form an emulsion wherein the immiscible liquid forms a discontinuous or co-continuous phase with the continuous reactive phase;
    b) shaping the emulsion; and
    c) irradiating the emulsion with actinic radiation having a wavelength of about 200 to about 800 nanometers, thereby causing the emulsion to polymerize such that it forms a stable foam.

2. The process of claim 1 wherein the initiator system further comprises a thermal initiator.

3. The process of claim 1 wherein the initiator system further comprises a redox initiator.

4. The process of claim 1 wherein the foam formed has an effective glass transition temperature of at least 30° C.

5. The process of claim 1 wherein the polymerizable material comprises an ethylenically unsaturated monomer.

6. The process of claim 1 wherein the polymerizable material is a cationically-curable monomer.

7. The process of claim 1 wherein one polymerizable material and the emulsifier are the same material.

8. The process of claim 1 wherein the immiscible liquid is water.

9. The process of claim 1 wherein the immiscible liquid comprises at least 74 volume percent of the emulsion.

10. The process of claim 1 wherein the reactive phase further comprises materials that can incorporate functional groups into the foam.

11. The process of claim 1 wherein an open cell foam is produced.

12. The process of claim 1 wherein a closed cell foam is produced.

13. The process of claim 1, wherein the step of shaping comprises coating the emulsion on a substrate.

* * * * *

UNITED STATES PATENT AND TRADEMARK OFFICE
CERTIFICATE OF CORRECTION

PATENT NO.        : 7,138,436 B2
APPLICATION NO.   : 09/880269
DATED             : November 21, 2006
INVENTOR(S)       : Lian Soon Tan It is certified that error appears in the above-identified patent and that said Letters Patent is hereby corrected as shown below:

On the title page item (57),
Line 6, Delete "polymized" and insert -- polymerized --, therefor.

<u>Column 3:</u>
Line 53, Delete "polymized" and insert -- polymerized --, therefor.
Line 65, Delete "comparability" and insert -- compatability --, therefor.

<u>Column 12:</u>
Line 31, Delete "emulsifers" and insert -- emulsifiers --, therefor.
Line 43, Delete "acylphospine" and insert -- acylphosphine --, therefor.
Line 48, Delete "αdimethoxy" and insert -- α dimethoxy --, therefor. (Consider Space)

<u>Column 13:</u>
Line 46, Delete "intiating" and insert -- initiating --, therefor.

<u>Column 14:</u>
Line 11, Delete "quaternary" and insert -- quarternary --, therefor.
Line 18, Delete "bypryridyl" and insert -- bypyridyl --, therefor.

<u>Column 17:</u>
Line 46, Delete "hydroxy" and insert -- Hydroxy --, therefor.

<u>Column 19:</u>
Line 45, Delete "isobutyrlnitrile" and insert -- isobutyronitrile --, therefor.

Signed and Sealed this

Fifteenth Day of May, 2007

JON W. DUDAS
*Director of the United States Patent and Trademark Office*